United States Patent
Doshi et al.

(10) Patent No.: US 8,737,980 B2
(45) Date of Patent: May 27, 2014

(54) END TO END APPLICATION AUTOMATIC TESTING

(71) Applicants: Dinesh Doshi, South Plainfield, NJ (US); Artun Kutchuk, Cardiff, CA (US); Deepa Jagannatha, Somerset, NJ (US); Ramesh Parmar, Scotch Plains, NJ (US)

(72) Inventors: Dinesh Doshi, South Plainfield, NJ (US); Artun Kutchuk, Cardiff, CA (US); Deepa Jagannatha, Somerset, NJ (US); Ramesh Parmar, Scotch Plains, NJ (US)

(73) Assignee: w2bi, Inc., South Plainfield, NJ (US)

( * ) Notice: Subject to any disclaimer, the term of this patent is extended or adjusted under 35 U.S.C. 154(b) by 0 days.

(21) Appl. No.: 13/629,117

(22) Filed: Sep. 27, 2012

(65) Prior Publication Data
US 2013/0078983 A1    Mar. 28, 2013

Related U.S. Application Data

(60) Provisional application No. 61/539,804, filed on Sep. 27, 2011.

(51) Int. Cl.
*H04M 3/00*    (2006.01)
*H04W 24/00*    (2009.01)
*H04W 8/24*    (2009.01)

(52) U.S. Cl.
CPC .............. *H04W 8/245* (2013.01); *H04W 24/00* (2013.01)
USPC .......................................... 455/418; 455/425

(58) Field of Classification Search
USPC ........... 455/418–420, 556.1, 423–425, 414.1, 455/557; 370/338, 328
See application file for complete search history.

(56) References Cited

U.S. PATENT DOCUMENTS

| | | | |
|---|---|---|---|
| 7,606,918 B2 | 10/2009 | Holzman et al. | |
| 8,315,655 B1 * | 11/2012 | Cole | 455/466 |
| 8,332,203 B1 * | 12/2012 | Poulin | 703/22 |
| 2003/0162580 A1 | 8/2003 | Cousineau et al. | |
| 2008/0058057 A1 | 3/2008 | Lau et al. | |
| 2009/0209250 A1 * | 8/2009 | Huq | 455/425 |

* cited by examiner

*Primary Examiner* — Brandon Miller
(74) *Attorney, Agent, or Firm* — McHale & Slavin, P.A.

(57) ABSTRACT

This invention describes remote management of end to end automated mobile application tests to be executed on the mobile devices that may be connected to network emulators or on live (real time) networks. Further, this invention relates to mobile data applications that need to connect to the packet data network over the radio network, and associated automated test systems and methods. Discloses is a method of having an end to end extraction of user actions, application behaviors, device state, and IP and radio layer messaging that can be centrally analyzed to understand the application impact on the network and device, as well as the application behavior for different network conditions.

12 Claims, 4 Drawing Sheets

END TO END APPLICATION AUTOMATIC TESTING

PRIORITY CLAIM

In accordance with 37 C.F.R. 1.76, a claim of priority is included in an Application Data Sheet filed concurrently herewith. Accordingly, the present invention claims priority under 35 U.S.C.§119(e), 120, 121, and/or 365(c) to U.S. provisional application No. 61/539,804 entitled "END TO END APPLICATION TESTING IN LIVE AND AUTOMATED MODE" filed on Sep. 27, 2011. The contents of which the above referenced application are incorporated herein by reference in its entirety.

FIELD OF INVENTION

The present invention relates to mobile wireless communication devices and in particular to an end to end application automatic testing in live or emulated networks.

BACKGROUND OF THE INVENTION

Traditionally mobile application tests are constrained to the higher level tests to understand application behavior on live or emulated networks. These tests gather the application functional behavior and results when they get exposed to different network conditions.

What is lacking in the art is a method of end to end application automatic testing in live or emulated networks to understand the interactions between the application, device and network across all layers and analyze the root cause of failures or abnormal behaviors

SUMMARY OF THE INVENTION

This invention describes remote management of end to end automated mobile application tests to be executed on the mobile devices that may be connected to network emulators or on live (real time) networks. This invention primarily relates to mobile data applications that need to connect to the packet data network over the radio network, and associated automated test systems and methods.

The current invention is to have a method of having an end to end extraction of user actions, application behaviors, device state, and IP and radio layer messaging that can be centrally analyzed to understand the application impact on the network and device, as well as the application behavior for different network conditions. The application impact on the network could, for example, include excessive signaling level messages, high frequency connect and disconnect requests, transmitting duplicate information while there is no change of state, and others.

The focus of this invention is to understand the interactions between the application, device and network across all layers automatically to further automatically analyze the root cause of failures or abnormal behaviors, as well as the impact of the application on the device and network. The application behaviors combined with message recordings can also be used by the automatic test execution platform to manage the emulated environment to replicate the real network and device conditions for remote automated testing.

An objective of this invention is to understand the end to end mobile application behavior and its impact on the network by gathering detailed radio and packet level messaging information between the mobile device and the network.

Yet still another objective of this invention is to include a presence feature which will enable the user to connect to multiple phones connected at different locations. The presence feature provides upon signup a tool to show all the connected users, and debug logs shall capture information about the users who are CONNECTED/DISCONNECTED states.

Another objective of this invention is to support Peer to Peer communication and provide a tool that will automatically determine device type and location for further communication.

Another objective of this invention is to provide a tool that will display if the phone is connected to the laptop displaying information about the remote phone/PC details, and capture the device screen and display on the tool.

Yet another objective of this invention is to provide a macro editor with the ability to list macros, create new macros, edit current macros and delete unwanted macros.

Other objectives, benefits and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objectives and features thereof.

DETAILED DESCRIPTION OF THE INVENTION

Figure 1:
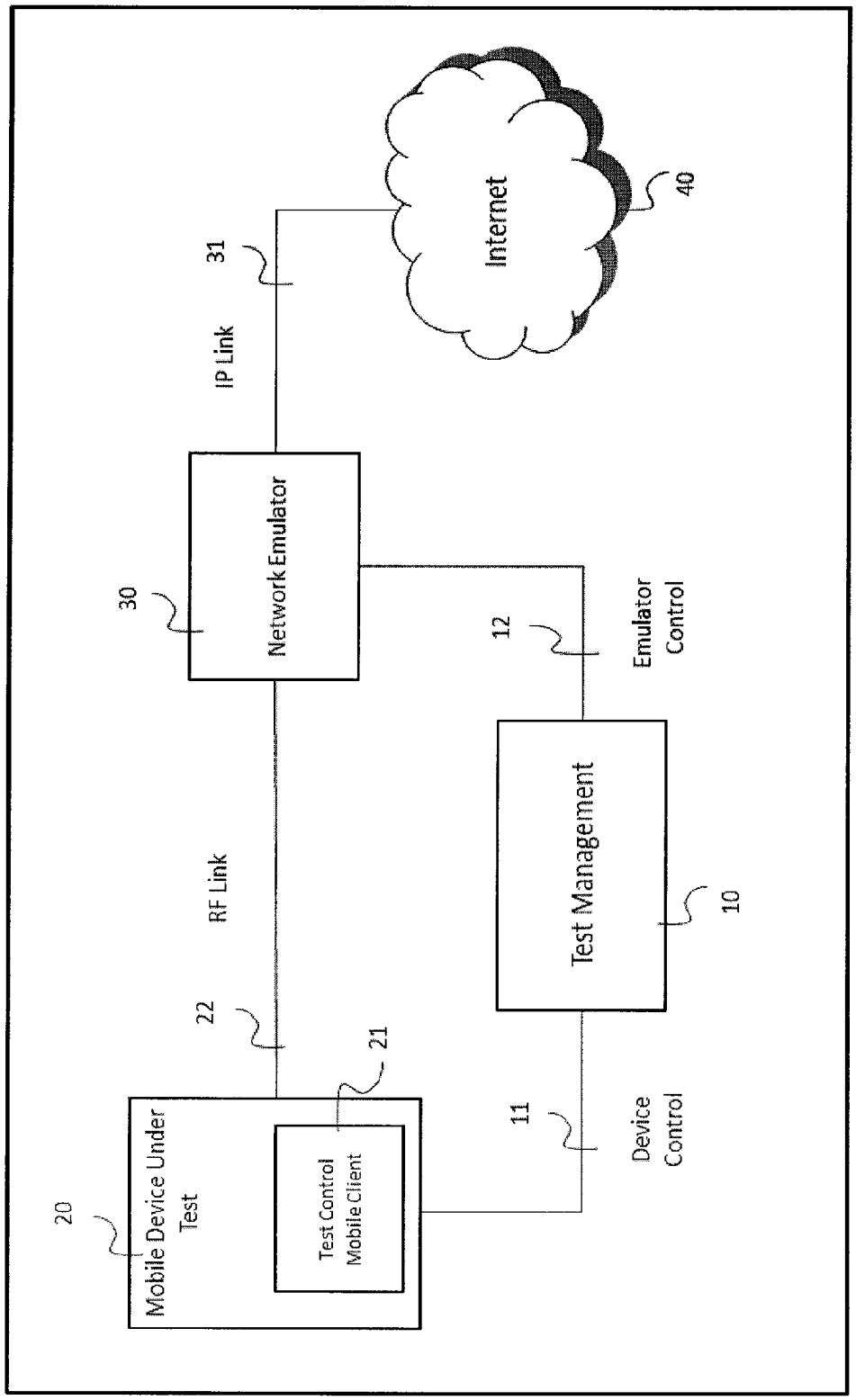
FIG. 1 is block diagram of an automated end to end application test environment.

The disclosed invention requires a mobile device to be connected to live (real time) network or to an emulated network environment, tethered to a PC hosting the automated test executive platform, and preloaded with remote access control software (see FIG. 1). The latter component enables the data gathering on the device and the remote access to the device to control the automated tests to be executed. The block diagram depicts an exemplary system of an Automated End-to-End Application Test environment to initiate and control tests, as well as collect the test results. The system consists of Test Management software 10, Mobile Device under test 20, Test Control Mobile Client 21, Network Emulator 30 and the Internet 40.

The Test Control Mobile Client 21 is responsible to receive the requests from Test Management system and act on the requests locally on the mobile device. These requests may include initiation of a specific mobile application on the device, injection of key or user interface events on the Mobile Device 20, and collection of device data or screen captures, etc. The Test Control Mobile Client 21 also transmits the data collected during the test to the Test Management system 10. The interfaces between system components include: Device Control 11 —the interface to control test initiation and completion, and collection of results between the Test Management system 10 and the Mobile Device Under Test 20.

Emulator Control 12—the interface from the Test Management system 10 to Network Emulator to control the test initiation and completion as well as collection of the test results. RF Link 22—the radio interface between the Mobile Device 20 and the Network Emulator 30 where the RF conditions are controlled, and the radio and IP layer messages transported. IP Link 31—the interface between the Network Emulator 30 and the Internet 40 where the IP traffic is transported.

Figure 2:
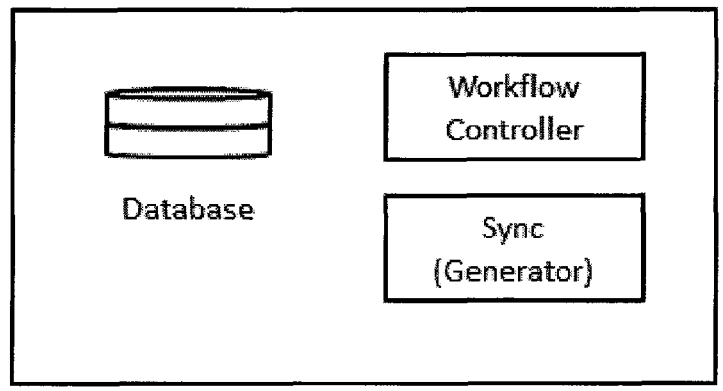
FIG. 2 is a block diagram of the workflow controller.
Figure 3:
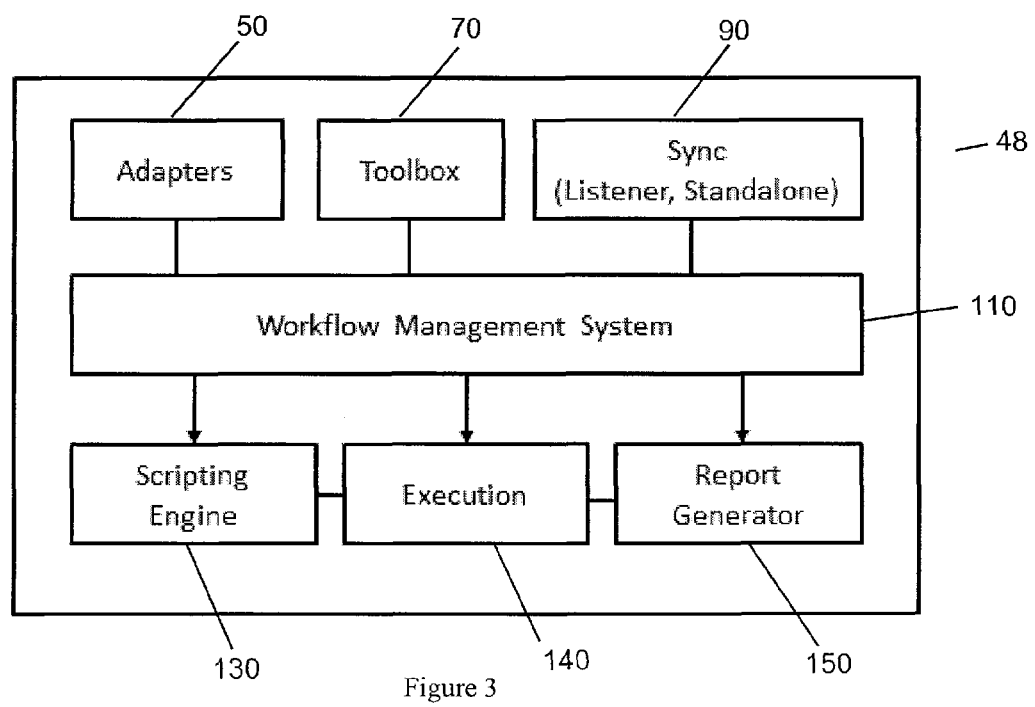
FIG. 3 is a block schematic of the server architecture.
Figure 4:
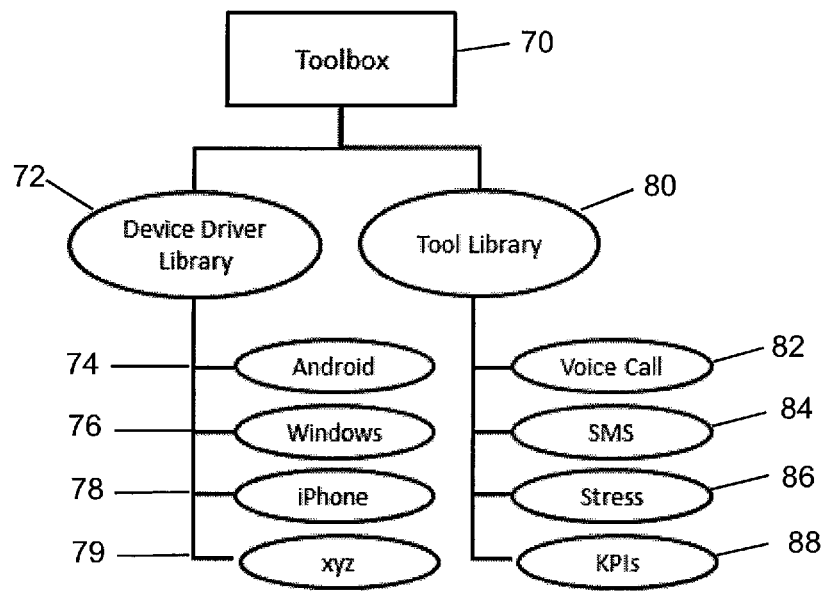
FIG. 4 is a block schematic of the toolbox module.
Figure 5:
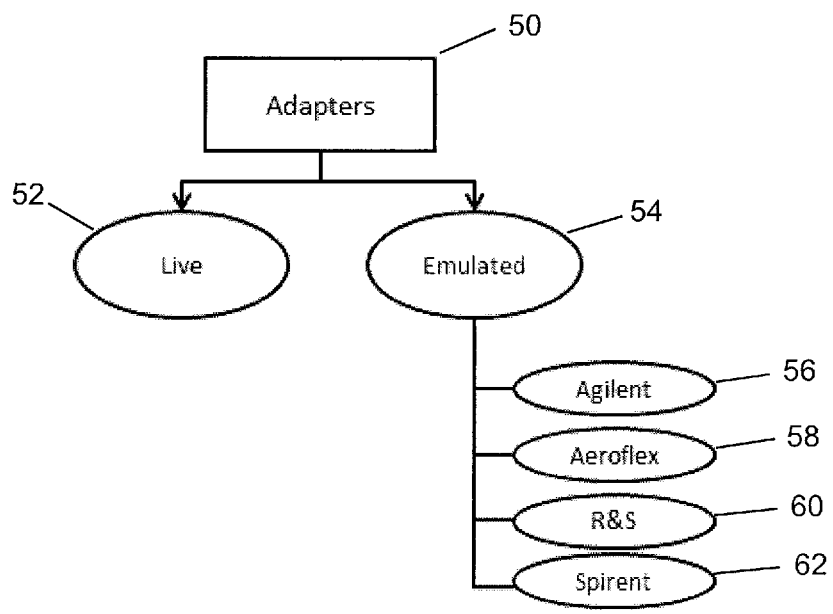
FIG. 5 is a block schematic of the adapters module.
Figure 6:
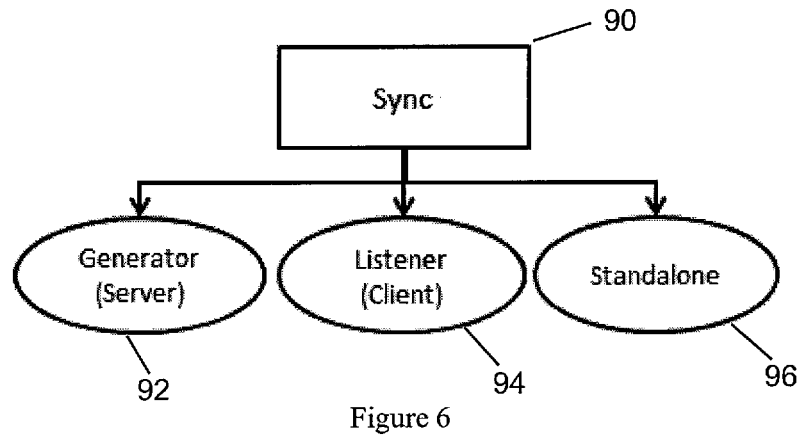
FIG. 6 is a block schematic of the sync module.
Figure 7:
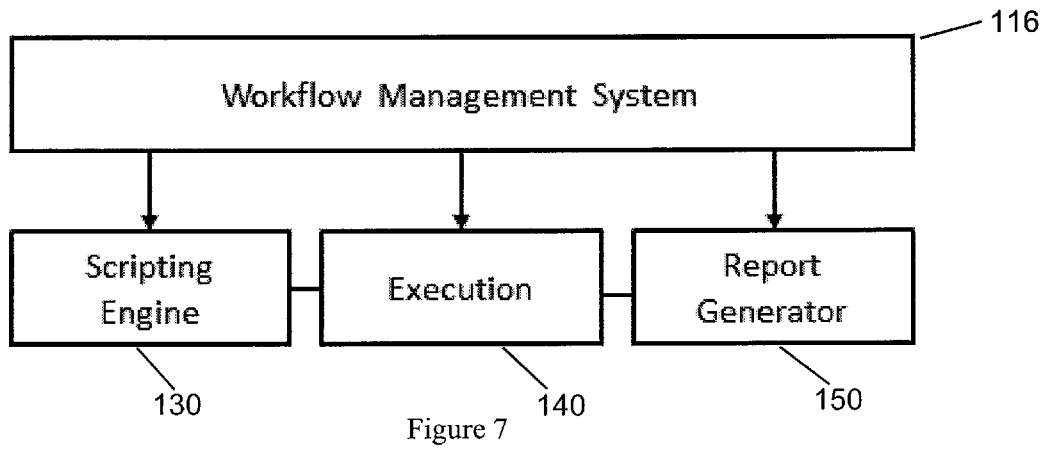
FIG. 7 is a block schematic of the workflow management system.
Figure 8:
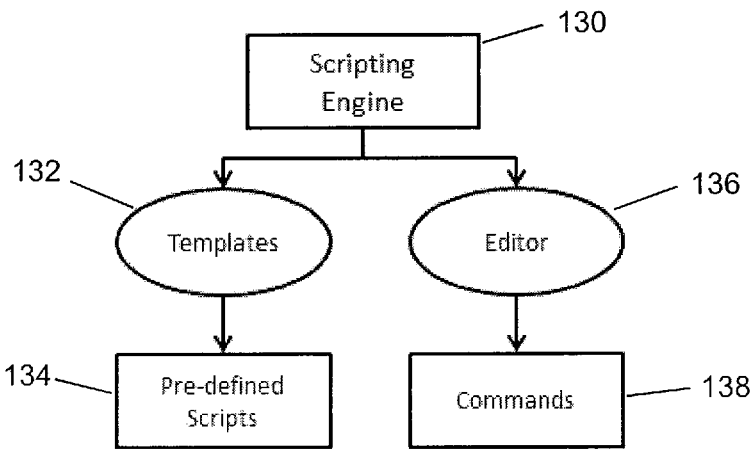
FIG. 8 is a block schematic of the scripting engine.

Referring to FIGS. 2 and 3, depicted is an exemplary system of an Automated End-to-End Application Test environment to initiate and control tests as well as collect the test results dynamically. The Test Management Software can be scaled to act like a Client Server Model or Standalone Model. In the client server model the server and client communicate via peer-to-peer connection. The server can communicate with any number of clients and sync. This model can be extended to control multiple devices at different locations based upon a workflow controller, sync and database. FIG. 3 sets forth the server architecture 48 having three primary components: Adapters 50, Toolbox 70 and Sync 90. Workflow Management System 110 forms the core engine and constitutes a Scripting Engine 130, Execution 140 and Report Generator 160.

Adapters 50 provide the right automation that is required to perform the task. There are two modes Live 52 and Emulated 54. From Emulated 54, a subset of Agilent 56, Aeroflex 58, R&S 60 or Spirent 62 is selected.

The Toolbox 70 contains the necessary tools to communicate and execute a function. It encompasses two libraries: Device driver library 72 and tool library 80. The libraries are a collection of device drivers for different OS type used to communicate with the device. From the device driver library, a driver for the Android 74, Window 76, iPhone 78 or xyz 80 can be chosen. The tool library 80 is a collection of tools used to execute a command/function on the device. From the tool library 80, voice call 82, SMS 84, Stress 86 or KPis 88 is selected.

Sync module 90 configures the system for three different modes of operation. This module provides timing reference to the system when configured in Generator-Listener modes. Generator 92, only the Server can be a generator for timing reference. Listener 94, client listens to the Server Generator for timing reference. Standalone 96, the system will be fully functional without any Server.

Workflow Management System 110 forms the core engine and constitutes of a Scripting Engine 130, Execution 140 and Report Generator 150. The scripting engine 130 provides the framework for the user to perform a structured or non-structured script execution. It consists of two modules. A templates module 132 is a collection of pre-defined scripts 134 which will be executed as part of structured testing. An editor template 136 provides the user interface for creating/editing custom scripts. Consists of editor commands 138 to create/modify scripts. In execution, it simply executes the scripts/commands sent by the scripting engine. A report generator pulls the result from the execution engine and produces a report.

The following steps are executed during automated application testing:
1. Start Test
2. Establish Connection to Mobile Device and Test Control Mobile Application.
3. Establish Connection to Emulator and Initialize Settings.
4. Upon successful device connection, send request from Test Management to Mobile Device to initiate an application with user entry information.
5. Upon successful network emulator connection, send radio condition settings to Network Emulator.
6. Test Control Mobile Application initiates specific application requested and generates the user entry based on the information received from Test Management.
7. If application fails to start, Test Control captures the failure condition and reports back the information to the Test Management
8. Upon successful start of the Mobile Application, the internet connection is initiated.
9. The Network Emulator opens the internet connection for the mobile device.
10. If internet connection fails, then the failure condition is captured by the Test Control and reported back to the Test Management.
11. If the internet connection is successful, then the specific application request (e.g. file upload, video viewing, etc.) is executed through the Mobile Control.
12. During the Mobile Application execution, the snapshots of the data transfer size, device state (e.g. battery level, current draw, Signal strength, network information, etc.) are captured both on the mobile device and the network emulator.
13. During the execution of the test control mobile application test the network and radio conditions are changed by the Test Management.
14. Upon submission of the device and emulator captured data, the Test Management computes the test specific key performance indicators, such as, application start success/failure, IP throughput distribution versus radio conditions, comparison of results against test thresholds to determine the overall test success and failure.

Benefits of this invention are applicable across the mobile industry, specifically the testing groups across the mobile operators, device manufacturers, application developers, testing services, and content providers. These benefits include: 1) Accelerating root cause identification of performance issues and failures; 2) Isolating issue identification to network, device or application; 3 Identifying mobile applications or device conditions that are causing excessive network load; 4) Ability to emulate the observed behavior including the lower level network message transactions in automated environment to significantly reduce the troubleshooting time; 5) In a network emulated environment apply the Operator and Network constraints to measure the device and application behaviors and performance; 6) Manage the end to end test execution process from a single graphical user interface that manages the target mobile device, the applications on the device, the emulated radio network conditions, the simulated mobile services (e.g. IP Multi Media Services), and the connectivity to external internet; 7) Measure application impact on network where some of the measurements would include: connect and disconnect requests, data transmission frequency with no user interactions; upload and download payload traffic; duplicate data transmission, and background device application data transmission characteristics.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for end to end application automatic testing comprising the steps of:
    establishing a connection between a mobile device and a test control mobile application, and connecting to a network emulator to initialize settings;
    forwarding a request from test management to said mobile device to initiate a test control mobile application with user entry information;
    send radio condition settings to said network emulator;
    generating a user entry from said test control mobile application based on information received from test management;
    initiating an internet connection upon successful start of the test control mobile application;
    opening the internet connection for the mobile device though the network emulator;
    executing a specific application request through said test control mobile application upon successful internet connection;
    capturing data transfer size on both the mobile device and the network emulator during the test control mobile application;
    changing the radio conditions by test management during execution of the test control mobile application on the network emulator;
    computing test specific key performance indicators by test management; and
    comparing the specific key performance indicators against test thresholds to determine test success.

2. The process for end to end application automatic testing according to claim 1 including the step of capturing a failure condition if an application fails to start and reporting the failure condition to the test management.

3. The process for end to end application automatic testing according to claim 1 including the step of capturing a failure condition if the internet connection fails and reporting the failure condition to the test management.

4. The process for end to end application automatic testing according to claim 1 including the step of capturing device state on both the mobile device and the network emulator during the test control mobile application.

5. The process for end to end application automatic testing according to claim 4 wherein said device state is selected from the group of battery level, current draw, signal strength and network information.

6. The process for end to end application automatic testing according to claim 1 wherein a snapshot of information is collected and stored on the device upon completion of a test and is submitted to the test management by mobile control.

7. The process for end to end application automatic testing according to claim 1 wherein results captured on the network emulator are stored with test management.

8. The process for end to end application automatic testing according to claim 1 wherein said test specific key performance indicators are selected from the group of: application start success/failure, IP throughput distribution versus radio conditions, and comparison of results against test thresholds to determine the overall test success and failure.

9. The process for end to end application automatic testing according to claim 1 wherein said testing is performed in real time.

10. The process for end to end application automatic testing according to claim 1 wherein said testing is performed in an automated mode.

11. The process for end to end application automatic testing according to claim 1 wherein a single graphical user interface manages the mobile device, the applications on the mobile device, the emulated radio network conditions and simulated mobile services.

12. The process for end to end application automatic testing according to claim 1 wherein said testing include measurements regarding application impact on network where some of the measurements include: connect and disconnect requests, data transmission frequency with no user interactions; upload and download payload traffic; duplicate data transmission, and background device application data transmission characteristics.

* * * * *